No. 663,553. Patented Dec. 11, 1900.
W. RIGBY.
FOOT REST AND BRAKE.
(Application filed Apr. 27, 1899.)

(No Model.) 3 Sheets—Sheet 1.

WITNESSES. INVENTOR.
William Rigby
By James A. Coubrough
Attorney

No. 663,553. Patented Dec. 11, 1900.
W. RIGBY.
FOOT REST AND BRAKE.
(Application filed Apr. 27, 1899.)
(No Model.) 3 Sheets—Sheet 2.

WITNESSES. INVENTOR.

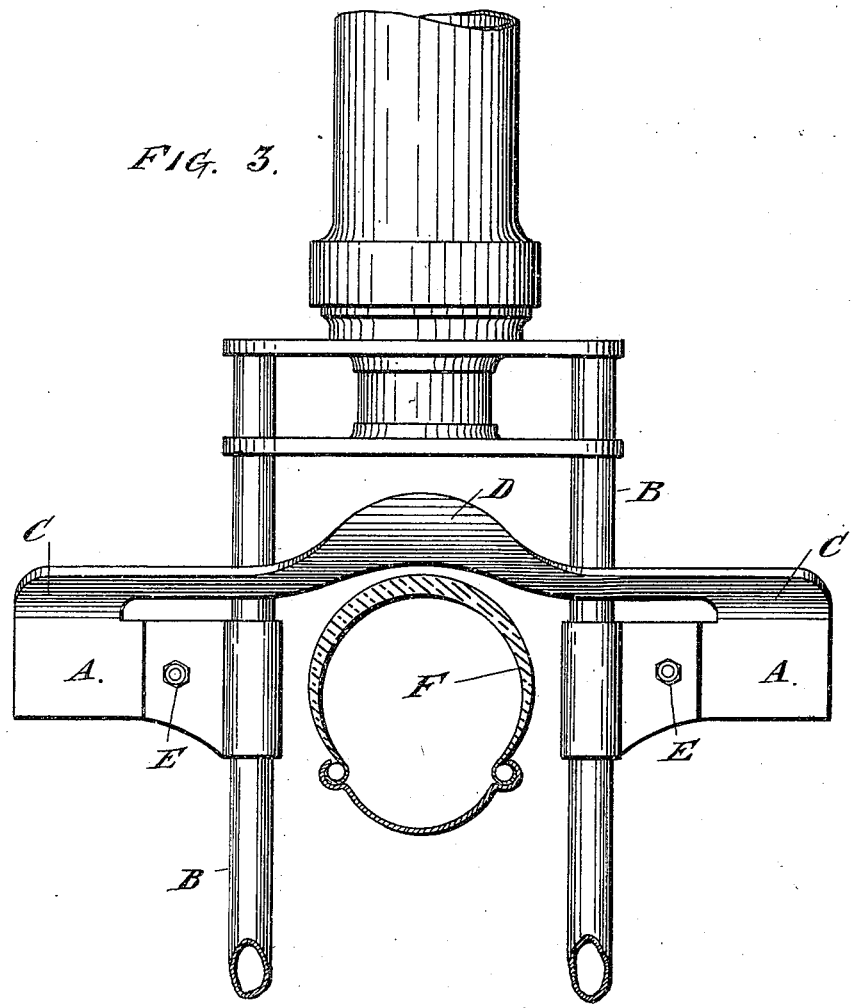

UNITED STATES PATENT OFFICE.

WILLIAM RIGBY, OF PRESCOT, ENGLAND.

FOOT-REST AND BRAKE.

SPECIFICATION forming part of Letters Patent No. 663,553, dated December 11, 1900.

Application filed April 27, 1899. Serial No. 714,754. (No model.)

*To all whom it may concern:*

Be it known that I, WILLIAM RIGBY, stonemason, a subject of the Queen of Great Britain and Ireland, and a resident of 27 Eccleston street, Prescot, in the county of Lancaster, England, have invented a certain new and useful Combined Foot-Rest and Brake for Velocipedes, (for which I have applied for a patent in Great Britain, No. 21,794, filed October 17, 1898,) of which the following is a specification.

This invention relates to a combined foot-rest and brake for velocipedes.

Figure 1:
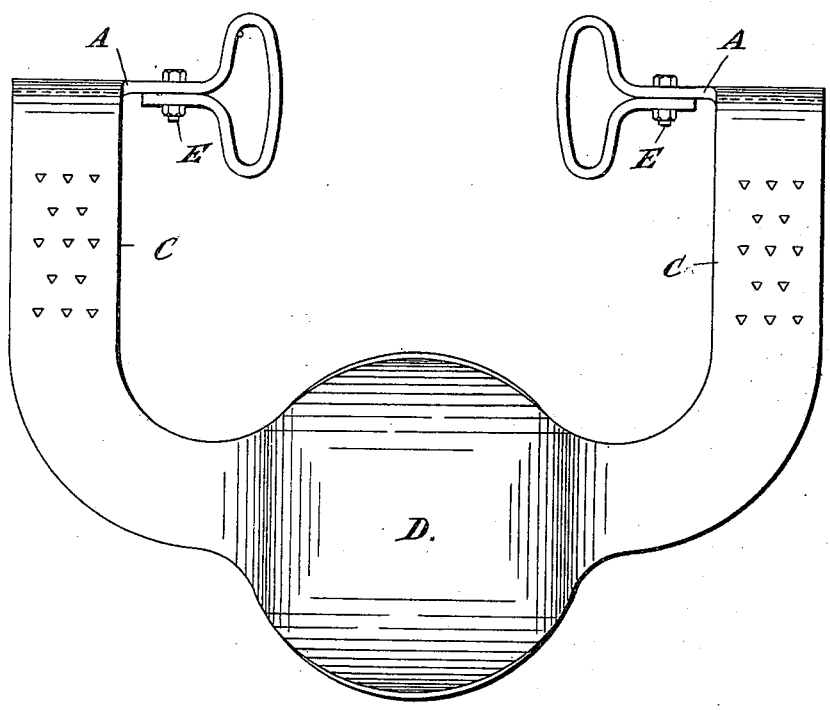
Figure 2:
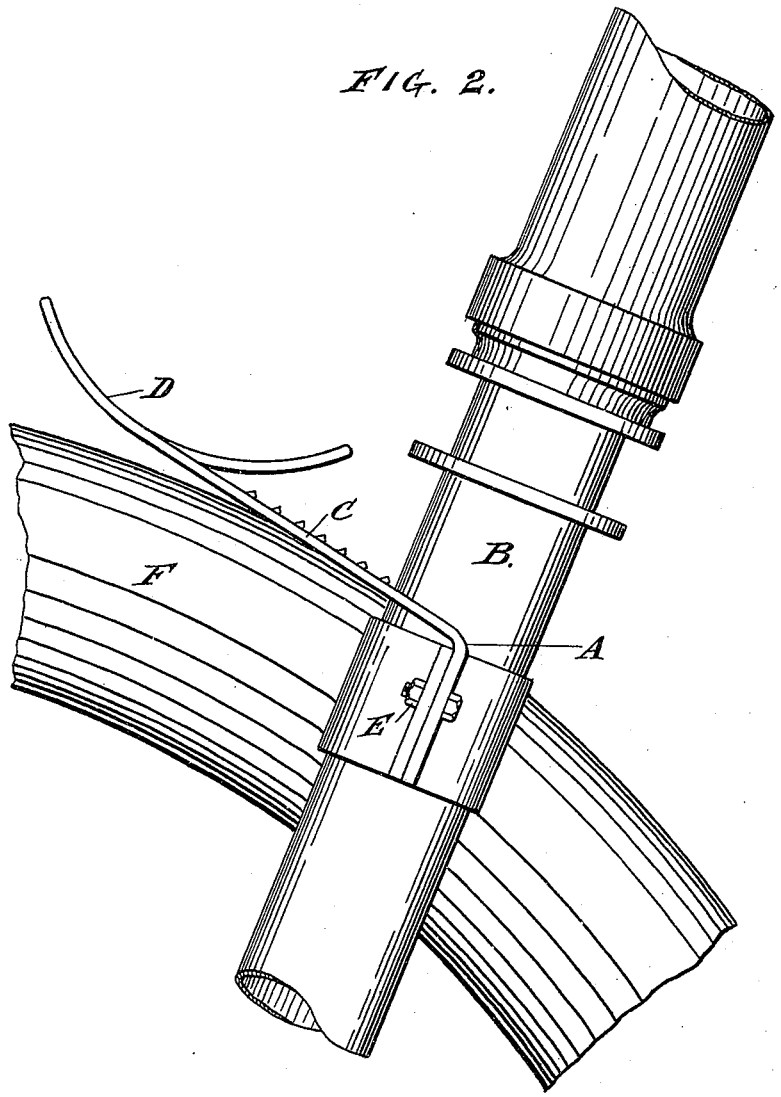

In the drawings hereto annexed, Figure 1 is a plan, Fig. 2 a side elevation, and Fig. 3 an end view, of a foot-rest and brake according to this invention.

On reference to the drawings it will be seen that the foot-rest and brake are cut and forged out of one piece of sheet metal and comprise foot-rests A, which fasten around the front fork B of the velocipede, side springs C, and a spoon-brake D. The foot-rests A are bent around the fork B and nipped by the bolt and nut E. The side springs C extend from the foot-rests, so that by advancing the feet onto the springs and depressing them the brake D can be pressed upon the tire F. Such side springs are preferably roughened or serrated to afford a good foothold. When not depressed by the feet, the springs C hold the brake clear of the tire.

The foot-rests A may be used as such without applying the brake D to the wheel.

Having now described my invention, what I claim as new, and desire to secure by Letters Patent, is—

A combined wheel-brake and foot-rest for velocipedes, formed from an integral piece of sheet metal, the brake being of horseshoe shape whose side arms C extend outwardly beyond the forks of the velocipede so that the feet of the rider can rest upon them, and possessing integral inwardly-extending strips of sufficient length to be bent back on themselves to form clamps, as described.

In witness whereof I have hereunto set my hand in presence of two witnesses.

WILLIAM RIGBY.

Witnesses:
F. H. FARAM,
J. A. COUBROUGH.